United States Patent
Kuo

(10) Patent No.: US 7,706,442 B2
(45) Date of Patent: Apr. 27, 2010

(54) METHOD FOR CODING MODE SELECTION OF INTRA PREDICTION IN VIDEO COMPRESSION

(75) Inventor: Chi-Chang Kuo, Fong-Shan (TW)

(73) Assignee: Industrial Technology Research Institute, Hsinchu (TW)

( * ) Notice: Subject to any disclaimer, the term of this patent is extended or adjusted under 35 U.S.C. 154(b) by 1449 days.

(21) Appl. No.: 11/057,125

(22) Filed: Feb. 15, 2005

(65) Prior Publication Data

US 2006/0182174 A1     Aug. 17, 2006

(51) Int. Cl.
*H04N 7/12*     (2006.01)

(52) U.S. Cl. ............ 375/240.12; 375/240; 375/240.01

(58) Field of Classification Search ............. 375/240, 375/240.01, 240.12, 240.24; 382/232
See application file for complete search history.

(56) References Cited

U.S. PATENT DOCUMENTS

| | | | |
|---|---|---|---|
| 5,883,976 A * | 3/1999 | Ohsawa | 382/232 |
| 6,208,693 B1 * | 3/2001 | Chen et al. | 375/240.24 |
| 6,782,052 B2 | 8/2004 | Sun et al. | |
| 2003/0206594 A1 | 11/2003 | Zhou | |
| 2003/0223645 A1 | 12/2003 | Sun et al. | |
| 2004/0008771 A1 | 1/2004 | Karczewicz | |

FOREIGN PATENT DOCUMENTS

| | | |
|---|---|---|
| JP | 2003-204548 | 7/2003 |
| JP | 2004140473 | 5/2004 |
| JP | 2004-304724 | 10/2004 |

OTHER PUBLICATIONS

Zhang, Y.D. et al., "Fast 4x4 Intra-prediction Mode Selection for H.264," *Proc. of 2004 IEEE Int. Conf. On Multimedia and Expo (ICME '04)*, Jul. 2004.
Meng, B. et al., "Fast Intra-Prediction Mode Selection for 4x4 Blocks in H.264," *Proc. of 2003 IEEE Int. Conf. on Acoustics, Speech, and Signal Processing (ICASSP '03)*, Apr. 2003.
Li, W. and Salari, E.; Successive Elimination Algorithm for Motion Estimation; IEEE Transactions on Image Processing; Publication Date: Jan. 1995; vol.: 4, Issue: 1; pp. 105-107.

* cited by examiner

*Primary Examiner*—Allen Wong
(74) *Attorney, Agent, or Firm*—Alston & Bird LLP

(57) ABSTRACT

A method and apparatus for selecting a coding mode of intra prediction in video compression. The method adapts an alternative full search (AFS) algorithm which reduces the computations of a conventional full search (FS) method. In the method, estimated sums of predicted blocks are obtained without actually forming predictors. By comparing the estimated sums of all modes with a low bound threshold, the undesired modes are quickly eliminated, and thus the number of predictor calculations and cost evaluations that require intensive computations are decreased.

17 Claims, 7 Drawing Sheets

X A B C D E F G H
I a b c d
J e f g h
K i j k l
L m n o p

METHOD FOR CODING MODE SELECTION OF INTRA PREDICTION IN VIDEO COMPRESSION

BACKGROUND

1. Field of the Invention

The present invention relates generally to a method for video compression, and more particularly, to a method of selecting a coding mode for intra-predicted block data within an image frame.

2. Background of the Invention

The ITU-T H.264 standard, which is also named MPEG-4 Part-10 Advanced Video Coding (AVC), has recently been developed as a next-generation compression tool for the coding of video content. Experimental results show that the H.264 standard provides a factor of two in compression efficiency compared to other exiting standards. Therefore, the H.264 standard is very suitable for use in the growing applications of Internet streaming, multimedia communications, and mobile televisions.

During the coding of a current block, to remove the spatial redundancy between its neighboring blocks, the H.264 standard provides a coding tool called "intra prediction" to form predictors from pixels around the current coding block. As shown in FIG. 1, according to the H.264 standard, there are a total of nine intra prediction modes for each 4 by 4 Luma block. Furthermore, FIG. 2 shows boundary pixels (A to L, and X) that are used to form the predictors (a to p) of the 4 by 4 predicted block in each of the prediction modes. The residual between the current coding block and the predicted block, which is formed according to a prediction mode, is processed by further coding procedures, such as transformation, quantization, and entropy coding to produce a compressed bitstream. Choosing a suitable intra prediction mode is important for the performance of compression as the more similar a predicted block is to the current coding block, the smaller the resulting residual is. Therefore, the amount of information that needs to be compressed is largely decreased so that the performance of compression can be improved.

A number of technologies for fast-selecting the intra prediction mode and rapidly performing the intra prediction have been introduced in the market. For example, in Japan Patent No. 2004-140473, an image information coding apparatus is provided to rapidly intra-predict each block based on a pipeline process. The apparatus sequentially processes the respective blocks in a pre-determined order except for the raster scanning.

In U.S. patent Publication No. 2003/0206594, a method of encoding intra frame is disclosed, which provides a probability table of the prediction modes according to an expected complexity of an encoder. The probability table is adjustable so that the blocks can be coded in a low-complexity encoding by using the low-complexity subset of modes, or in a high-complexity encoding using any prediction mode. This permits a low-complexity decoder responsive to only the low-complexity subset of modes.

U.S. patent Publication No. 2003/0223645 discloses methods and systems for estimating a pixel prediction mode to be used in a video encoding or decoding process. This application classifies the prediction modes by five groups that are ordered in a manner with their likelihood of producing a reduced prediction error. The prediction mode order is expressed according to the positions of the blocks that are near the edges or boundaries of an image frame.

U.S. patent Publication No. 2004/0008771 discloses a method and device for coding a digital image using an intra-mode block prediction. The modes assigned to each combination of prediction modes may be divided into two groups. The first group includes n most probable prediction modes (where n is smaller than the overall number of available modes) and the second group includes the remaining modes. The modes in the first group are ordered according to their probability. This order may be specified as a list of modes ordered from the most probable mode to the least probable mode. The modes of the second group may be ordered in a predetermined manner, which may be specified depending on the information already available to a decoder.

Furthermore, one known technology selects an intra prediction mode with a reasonable computational complexity via various approaches including a partially computation of the cost function, an early termination, and a selective computation of highly probable modes to save the time of selecting the intra prediction mode. Another known technology provides a fast mode selection method by examining the most probable modes. This method is based on an assumption that the suitable prediction mode of a block is most likely in the direction of a local edge within that block. The local edge information is obtained with additional calculations for the edge feature parameters of the current coding block. For more details on the fast algorithms for intra prediction mode selection, references may be made to B. Meng and O. C. Au, "Fast intra-prediction mode selection by 4 by 4 blocks in H.264," in Proc. Of 2003 IEEE Int. Conf. On Acoustics, Speech, and Signal Processing (ICASSP '03), April 2003, and Y. D. Zhang, F. Dai, and S. X. Lin, "Fast 4 by 4 Intra-prediction Mode Selection for H.264," in Proc. Of 2004 IEEE Int. Conf. On Multimedia and Expo (ICME '04), July 2004.

The above technologies, however, only rely on fewer candidates of modes and roughly evaluate matching errors of the predicted blocks. Therefore, there are some difficulties in achieving an optimum selection of intra prediction modes. That is, these prior art methodologies cannot achieve maximum compression performance.

Furthermore, to achieve the best compression performance, each 4 by 4 block in an image frame needs to be encoded with its optimal intra prediction mode. To find the optimal intra prediction mode, a full search (FS) is commonly used for all the nine prediction modes of FIG. 1 because of its good performance and regularity for easy implementation. In an H.264 reference program JM 7.3, a full search algorithm is developed to select the optimal mode for each 4 by 4 block. The cost measure for each mode is based on the sum of absolute difference (SAD) between the predicted block and the current coding block. Let $C(i, j)$ and $Pm(i, j)$ be the pixel intensities at coordinate $(i, j)$ of the current 4 by 4 coding block (C) and the predicted 4 by 4 block (Pm) according to mode m ($0 \leq m \leq 8$), respectively. The sum of absolute difference between Pm and C is denoted by SAD(m), which is given by:

$$SAD(m) = \Sigma\Sigma |Pm(i,j) - C(i,j)|, \ 0 \leq (i,j) \leq 3 \quad (1)$$

Therefore, in the H.264 reference program, the FS method may include the following steps:

(1) Generating a predicted 4 by 4 block Pm according to the mode m;

(2) Calculating the cost of the mode m, denoted by COST (m) as given below:

$$COST(m) = SAD(m) + 4*F(QP)*MP \quad (2)$$

wherein F(QP) is a function of the quantization parameter (QP) and $F(QP) \geq 0$. MP is 0 if m is the most probable mode; otherwise MP is 1.

(3) Repeating steps (1) and (2) for 0≦m≦8. Choosing the one that has the minimum COST(m) as the optimal intra prediction mode.

According to the H.264 reference program, except for the mode (0) (vertical prediction) and mode 1 (horizontal prediction), the predictors in other modes are calculated by the mathematical functions of the boundary pixels. Take the mode 2 (DC prediction) as an example. Each predictor in the DC predicted block has the same value that is calculated from (4A+4B+4C+4D+4I+4J+4K+4L+4)>>3, wherein {A, B, C, D, I, J, K, L} are the boundary pixels as shown in FIG. 2, and >> is a bit-wise operator for a shift-right operation. For a digital signal processor (DSP) with single operation for accumulative multiplication, the count of operations for generating DC predicted block is 9 (i.e., 8 accumulative multiplication and 1 shifting.) The expressions and the counts of operations for other 8 modes are shown in Tables I-IX, which show a total of 192 operations for generating predictors in these 9 modes. (See Table X at the end of the specification.) If fixed QP is used for each block, it takes 31 operations for COST(m) when m is the most probable mode; otherwise 32 operations are needed. As a result, the FS method would take (192+31+32*8)=479 operations for each 4 by 4 blocks. This large operation number is computationally expensive for the FS method.

Therefore, there is a need for a new approach to find the optimal intra prediction mode, which is computationally efficient compared to the FS method.

BRIEF SUMMARY OF THE INVENTION

An object of the present invention is to provide an alternative full search (AFS) method for the intra prediction modes. The AFS method reduces the complexity of the FS method by eliminating useless modes before calculating the cost of the predicted block for mode m (COST(m)). Therefore, the computational complexity can be reduced efficiently, while the PSNR (peak signal-to-noise ratio) and the bit-rate are approximately the same as that in the FS method.

In accordance with one preferred embodiment of the present invention, an apparatus for selecting a coding mode of intra prediction in video compression is provided. The apparatus includes an input port for receiving data including a current coding block, boundary pixels surrounding the current coding block, a quantization parameter, and modes of neighboring blocks; a microprocessor for determining at least one of an optimal mode and a minimum cost COSTmin used for the video compression based on the received data, and an output port for outputting the at least one of the optimal mode and COSTmin.

In another preferred embodiment, the apparatus further includes a means for determining the coding mode. The means for determining the coding mode includes a first calculator for calculating estimated sums of predicted blocks, a second calculator for calculating a sum of a current coding block, a comparator for comparing the estimated sums of the predicted blocks with the sum of the current coding block, and choosing a specific mode k, a generator for generating a predicted block for the mode k, and a third calculator for calculating a cost COST(k) for the mode k.

In the above embodiment, in the mode k, an absolute difference between the estimated sum of the predicted blocks for mode k and the sum of the current coding block has a smallest value, and a temporary minimum cost COSTmin is initiated as COST(k). Furthermore, the comparator further compares a cost COST(n) of a mode n (n≠k) with the temporary minimum cost COSTmin when the absolute difference between the estimated sum for mode n and the sum of the current block is smaller than COSTmin. If the COST(n) is smaller than the temporary COSTmin, the microprocessor updates the temporary minimum cost to the COST(n) and a temporary optimal coding mode to be the mode n.

A further preferred embodiment of the present invention provides a method for selecting a coding mode of intra prediction in video compression. The method includes receiving data including a current coding block, boundary pixels surrounding the current coding block, a quantization parameter, and modes of neighboring blocks, calculating estimated sums of predicted blocks for all modes, and determining an optimal coding mode based on the estimated sums of the predicted blocks. In the embodiment, the optimal coding mode includes a feature that a sum of absolute difference (SAD) between the predicted block for the optimal coding mode and the current coding block is smallest among all of the modes.

Another preferred embodiment further includes calculating the estimated sums of the predicted blocks for all modes, calculating a sum of the current coding block (SUMC), comparing absolute differences between the estimated sums of the predicted blocks and the sum of the current coding block (i.e., |ESUMP(m)−SUMC|), finding a mode k of which |ESUMP(k)−SUMC| is smallest among all of the modes, generating a predicted block Pk for the mode k, calculating a cost COST(k) of the predicted block Pk, and setting COST(k) and the mode k as an initial minimum cost COSTmin and an initial optimal mode.

The method further compares the absolute difference of the estimated sum of the mode n (n≠k) and the sum of the current coding block with the COSTmin, and if the absolute difference is smaller than the COSTmin, generates a predicted block for the mode n, calculates a cost COST(n) of the mode n, comparing the COST(n) with the COSTmin, and updates the COSTmin and the optimal mode to be COST(n) and n if the COST(n) is smaller than the COSTmin.

Another preferred embodiment of the present invention includes a method for calculating estimated sums of predicted blocks in a video compression application. The method includes receiving boundary pixels that are surrounding the current coding block, and calculating estimated sums of the predicted blocks according to the mathematic functions of the boundary pixels without actually forming the predicted blocks.

DETAILED DESCRIPTION OF THE INVENTION

Figures 1, 2:
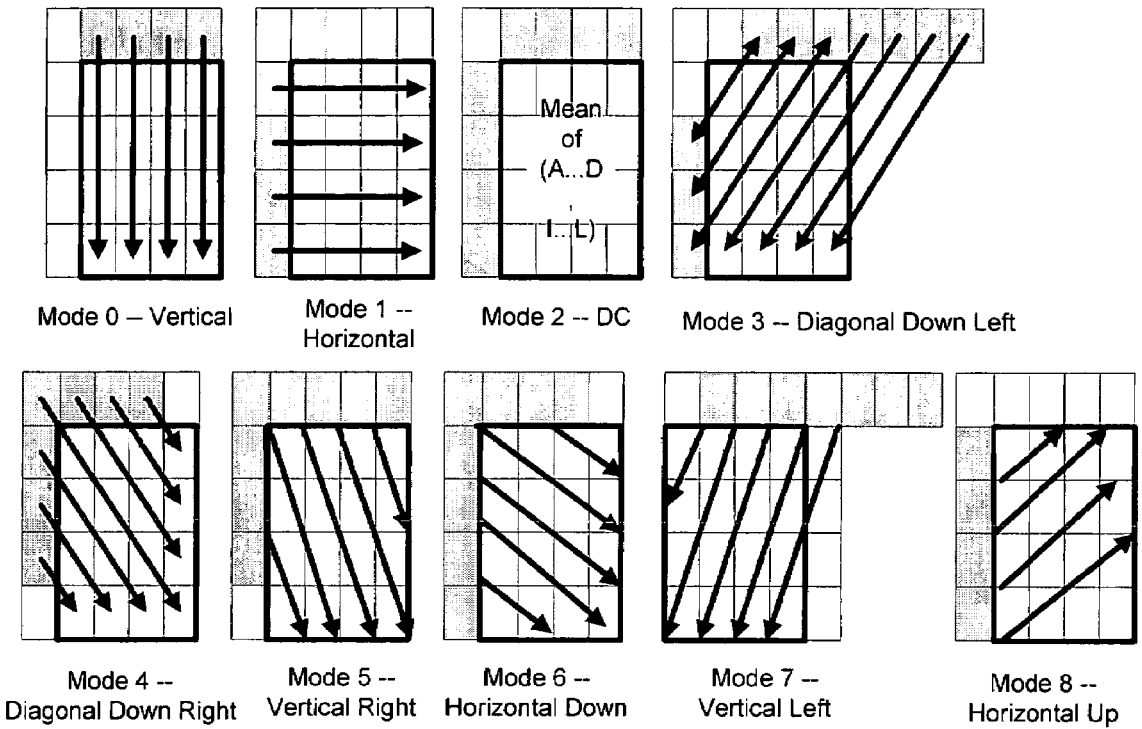
FIG. 1 shows nine coding modes of intra prediction for a 4 by 4 block in accordance with the H.264 standard.
FIG. 2 shows boundary pixels (A to L and X) that are used to form predictors (a to p) of a 4 by 4 predicted block.

A preferred embodiment of the present invention provides an alternative full search (AFS) method for intra prediction modes. According to the preferred embodiment, the AFS method reduces the complexity of the conventional FS method by eliminating useless modes before calculating the cost of the predicted block for mode m (COST(m)). A criterion of the elimination is based on a lower bound of SAD(m), which can be obtained by an estimated sum of a predicted block Pm for mode m without actually generating the block Pm. Here, SAD(m) is the sum of absolute difference between the predicted block Pm and a current 4 by 4 block C. Therefore, the AFS method reduces the computational complexity efficiently, while the PSNR (peak signal-to-noise ratio) and bit-rate are substantially maintained at the same levels achieved with the FS method.

In the conventional block-matching method, by employing a successive elimination algorithm (SEA) for motion estimation, the full search approach that uses the SAD as the matching criterion can be efficiently sped up. Based on a mathematical triangle inequality used in the SEA, the SEA excludes many candidates from calculating the SAD by evaluating the lower bounds of the SAD. For more details on SEA for motion estimation, reference may be made to W. Li and E. Salari, "Successive elimination algorithm for motion estimation." IEEE Trans, Image Processing, Vol. 4, pp. 105-107, Jan. 1995.

The present invention extends the concept of SEA to find out the best matching intra-prediction block, and the mathematical inequality in the SEA is modified by:

$$SAD(m) = \Sigma\Sigma|Pm(i,j) - C(i,j)| \geq |SUMP(m) - SUMC|, \quad (3)$$

$$SUMC = \Sigma\Sigma C(i,j), \quad (4)$$

$$SUMP(m) = \Sigma\Sigma Pm(i,j), \quad (5)$$

wherein C(i, j) and Pm(i, j) are the pixel intensities at coordinate (i, j) of a current coding block C and the predicted block Pm according to mode m, respectively, and SUMP(m) and SUMC are the actual sum of the predicted blocks according to mode m and the sum of the current coding block, respectively.

According to the inequality of (3), if there is a mode k of which the SAD(k) is the minimum value of all, it guarantees that $SAD(m) \geq |SUMP(m) - SUMC| > SAD(k)$ when m≠k. Therefore, the calculations of SAD(m) can be eliminated when |SUMP(m)−SUMC| is larger than the specific lower bound, thereby saving 31 operations.

However, in most of the modes, the total operations for SUMP(m) are larger than 31. Take the mode 5 as the example. As shown in Table X, it first takes 36 operations to generate P5, and then it takes 15 operations to calculate SUMP(5). As a result, it totally needs (36+15)=51 operations to obtain SUMP(5). This amount of operations, however, is still considerably large. Therefore, it would be desirable to reduce the operations for SUMP(m).

In accordance with the present invention, the SUMP(m) in inequality of (3) is replaced by an estimate value, which is obtained without the cost of generating Pm. As the predictors (a-p) are generated from the boundary pixels (A-L and X), as shown in FIG. 2, the SUMP(m) can be estimated by a mathematic function of these pixels directly. The estimated sum of the predicted block according to mode m is denoted by ESUMP(m) and is calculated by the following equation:

$$ESUMP(m) = ((\Sigma(WCm(i,j)*BP(i,j))) + RCm)$$
$$>> SRm << SLm,$$

wherein BP(i, j) is the intensity of the boundary pixel at coordinate (i, j) that are surrounding the current coding block, WCm(i, j) is the weighting constant of BP(i, j) for a mode m, RCm is the rounding constant for a mode m, SRm and SLm are the numbers of shift-right and shift-left operations for a mode m, respectively, and symbols >> and << are bit-wise operators for shift-right and shift-left operations, respectively.

Table XI shows the expressions for ESUMP(m) for all of the modes. In Table XI, the symbols >> and << are bit-wise operators for shift-right and shift-left operations, respectively. As shown in Table XI, the counts of operations for calculating ESUMP(m) are smaller than those of SUMP(m).

To quickly obtain the lower bound of SAD, the inequality of (3) can be modified to:

$$SAD(m) \geq |ESUMP(m) - SUMC|$$

$$\Rightarrow (SAD(m) + 4*F(QP)*MP) \geq |ESUMP(m) - SUMC|$$

$$\Rightarrow COST(m) \geq |ESUMP(m) - SUMC|. \quad (6)$$

From the above inequality of (6), the AFS method of the preferred embodiment of the present invention skips the calculations of COST(m) if |ESUMP(m)−SUMC| is larger than the current minimum cost to reduce the computations.

Figure 3:
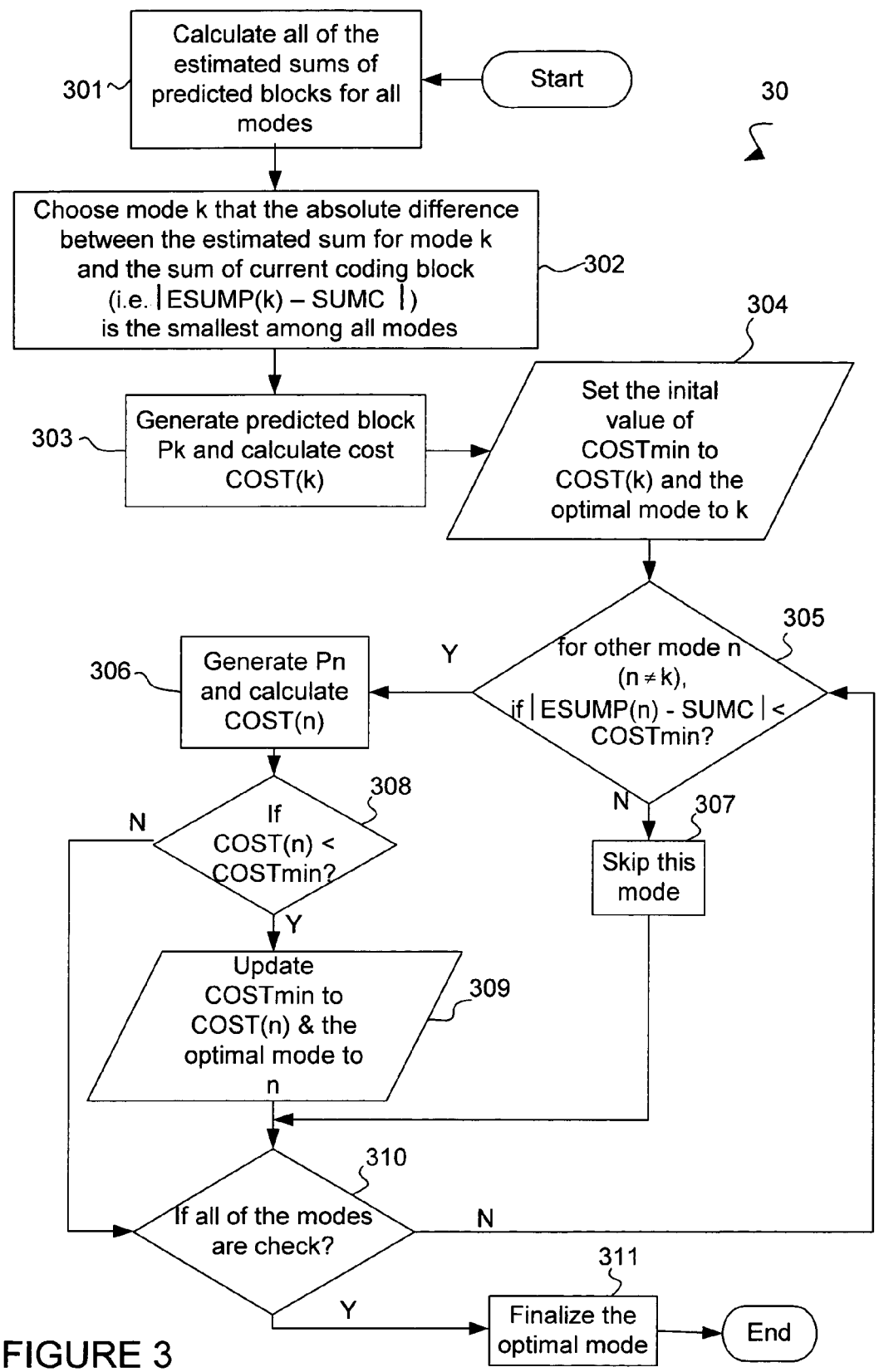
FIG. 3 is a flow chart showing an alternative full search (AFS) method in accordance with one preferred embodiment of the present invention.

The details of the AFS method in accordance with one preferred embodiment of the present invention are described with reference to FIG. 3. Flow chart 30 illustrates steps of selecting an optimal coding mode of intra prediction for video compression.

In accordance with the present invention, the AFS method first chooses an initial optimal mode and an initial minimum cost (COSTmin) as basic data. To do so, as shown at step 301, process 30 first calculates all of the estimated sums for all modes.

At step 302, all of the estimated sums are compared with the sum of the current coding block SUMC and mode k, that the absolute difference |ESUMP(k)−SUMC| is smallest among all of the modes, is chosen. Next, at step 303, the predicted block Pk for mode k is generated and its cost COST(k) is calculated.

At step 304, after Pk and COST(k) are obtained, the process sets the initial value of COSTmin to be COST(k) and the initial optimal mode to be k.

Next, at step 305, the process calculates the estimated sum of the predicted block for another mode n where n≠k, and determines if the absolute difference |ESUMP(n)−SUMC| is smaller than COSTmin. If not, the method skips the calculation of mode n, as shown at step 307. Otherwise, the process goes to step 306.

At step 306, the process generates predicted block Pn for mode n and its cost COST(n).

At step 308, the process decides whether COST(n) is smaller than the COSTmin. If so, the process updates the COSTmin to be COST(n) and the optimal mode to be n, as shown at step 309. Otherwise, the process goes to step 310.

At step 310, if all of the modes are checked, a final optimal mode is determined, as shown at step 311 and the process ends. If not all of the modes are checked, the process repeats steps 305 to 309 until all of the modes are checked and a final optimal mode is determined.

From the process described above, the calculations for deciding the optimal coding mode are efficiently reduced. For example, if COST(0) is the smallest of all and mode 0 is also the most probable mode, the method would only take (60+15+9+31)=115 operations to find the optimal intra prediction mode, wherein 60 is the total operations of calculating the estimated sums, 15 is the operations for SUMC, 9 is the operations for |ESUMP(m)−SUMC| for all of the modes, and 31 is the operations needed to calculate the cost COST(0). Accordingly, the computational complexity of the AFS method of the present invention is decreased efficiently as compared with the conventional FS method that requires 479 operations.

Figure 4:
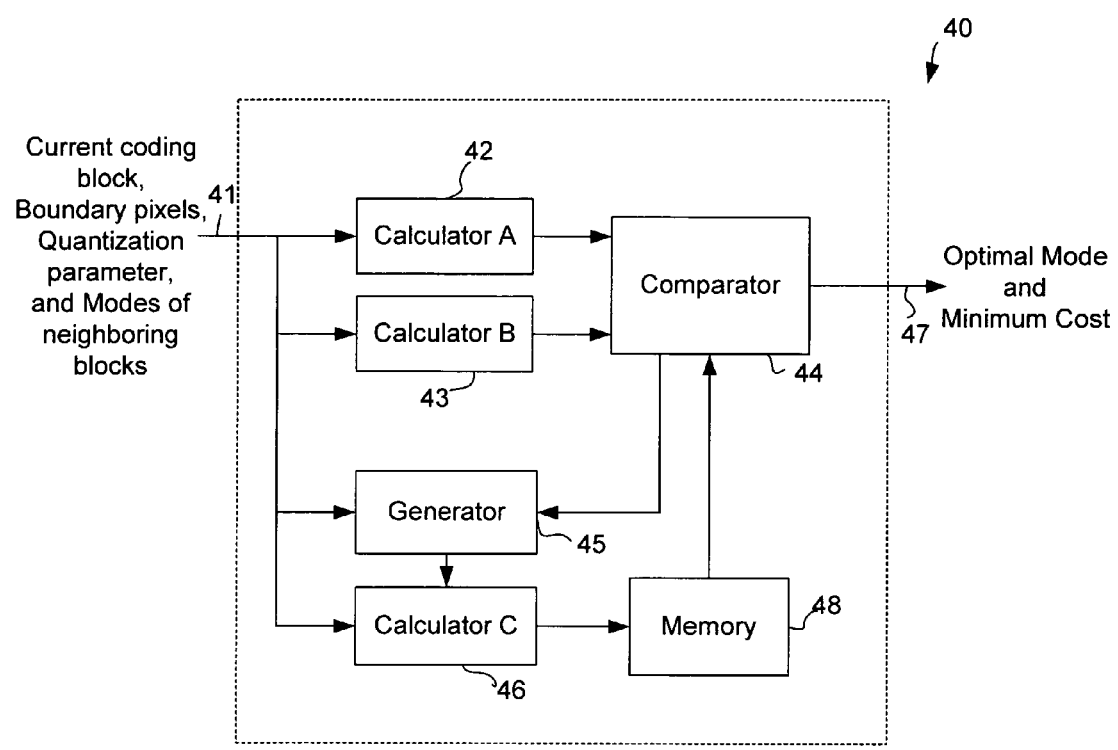
FIG. 4 is a block diagram of an apparatus for selecting a coding mode of intra prediction in video compression in accordance with another preferred embodiment of the present invention.
Figure 5:
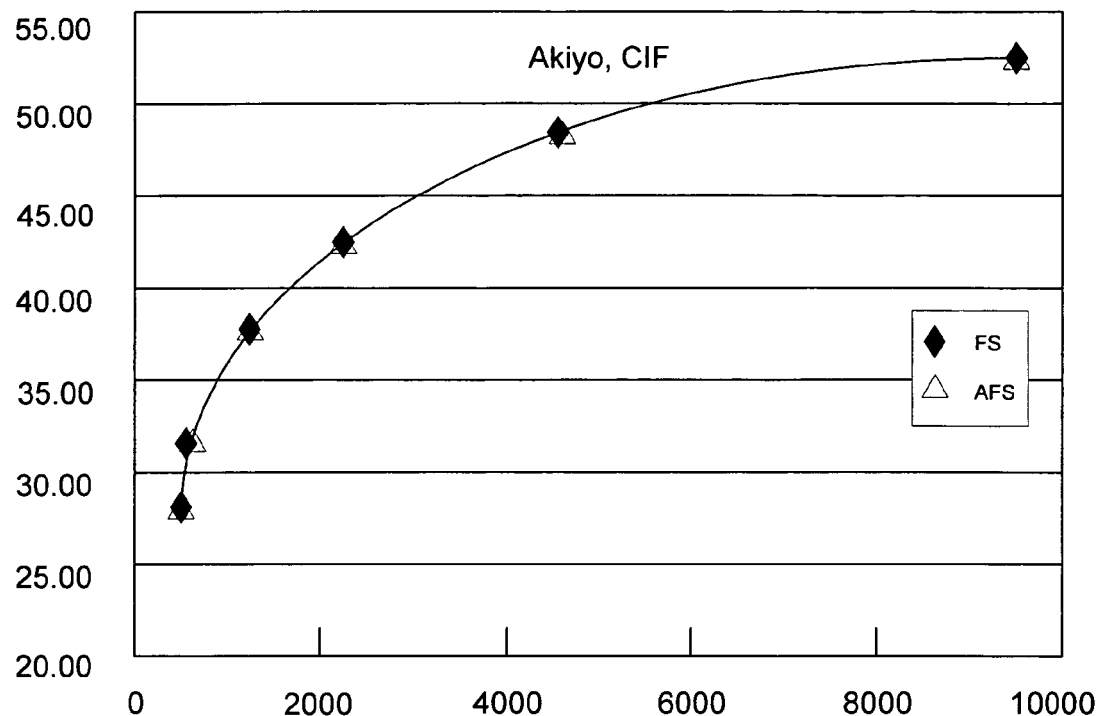
FIG. 5 shows a simulation result of selecting a coding mode for a CIF (352 by 288 pixels) video sequences "Akiyo" (300 frames) by means of a preferred embodiment in accordance with the present invention.
Figure 6:
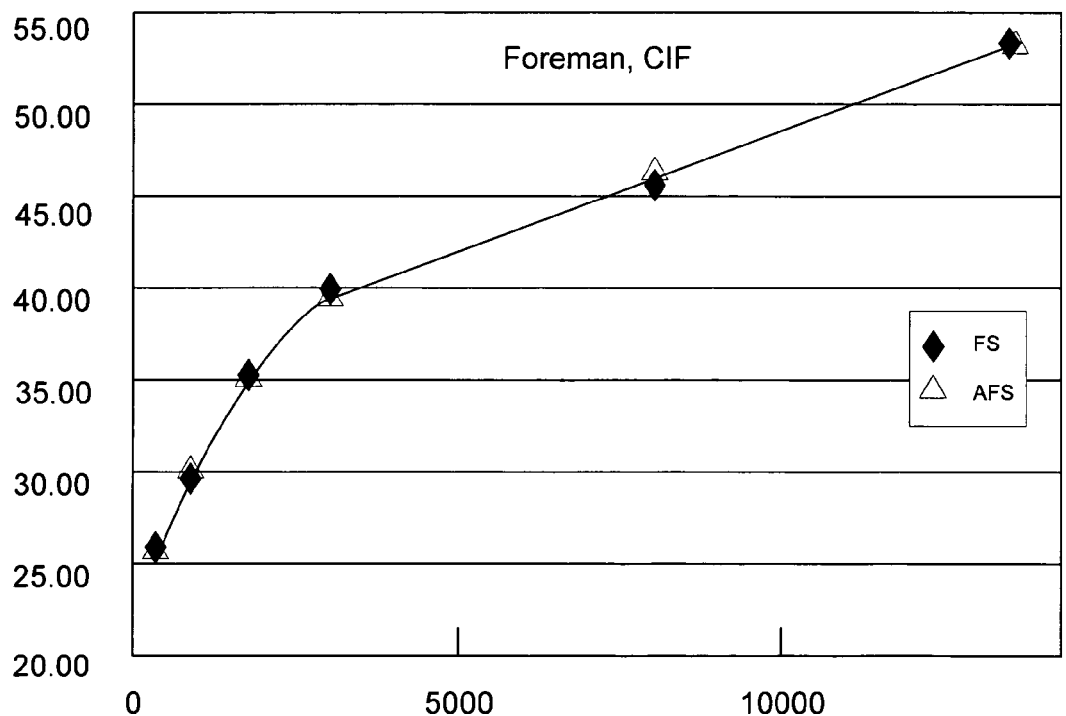
FIG. 6 shows a simulation result of selecting a coding mode for a CIF (352 by 288 pixels) video sequences "Foreman" (300 frames) by means of a preferred embodiment in accordance with the present invention.
Figure 7:
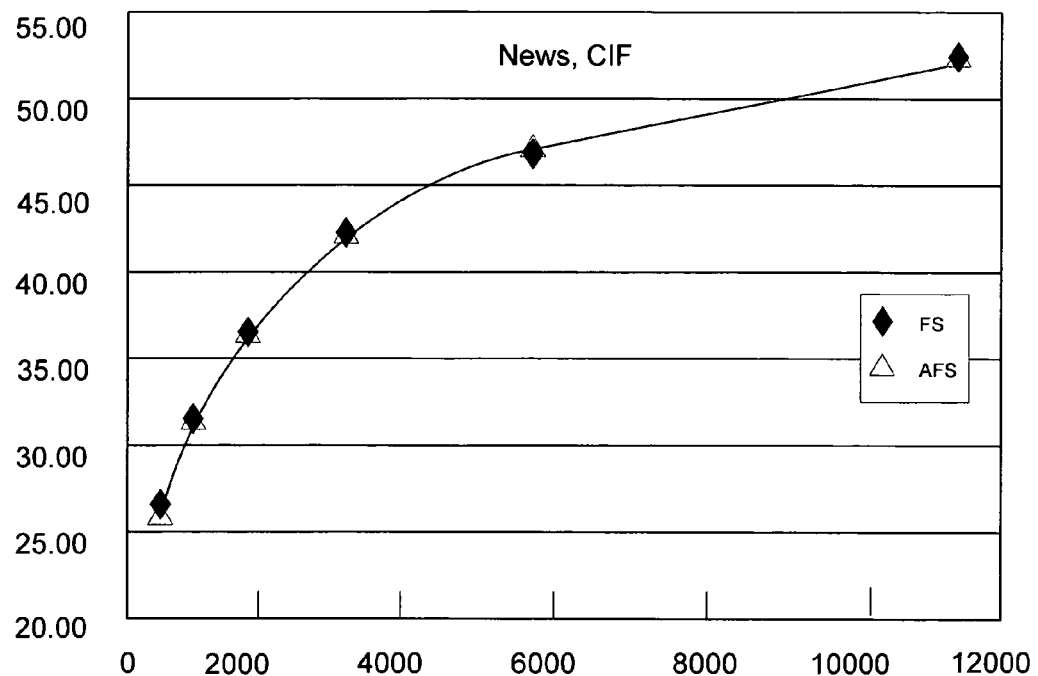
FIG. 7 shows a simulation result of selecting a coding mode for a CIF (352 by 288 pixels) video sequences "News" (300 frames) by means of a preferred embodiment in accordance with the present invention.
Figure 8:
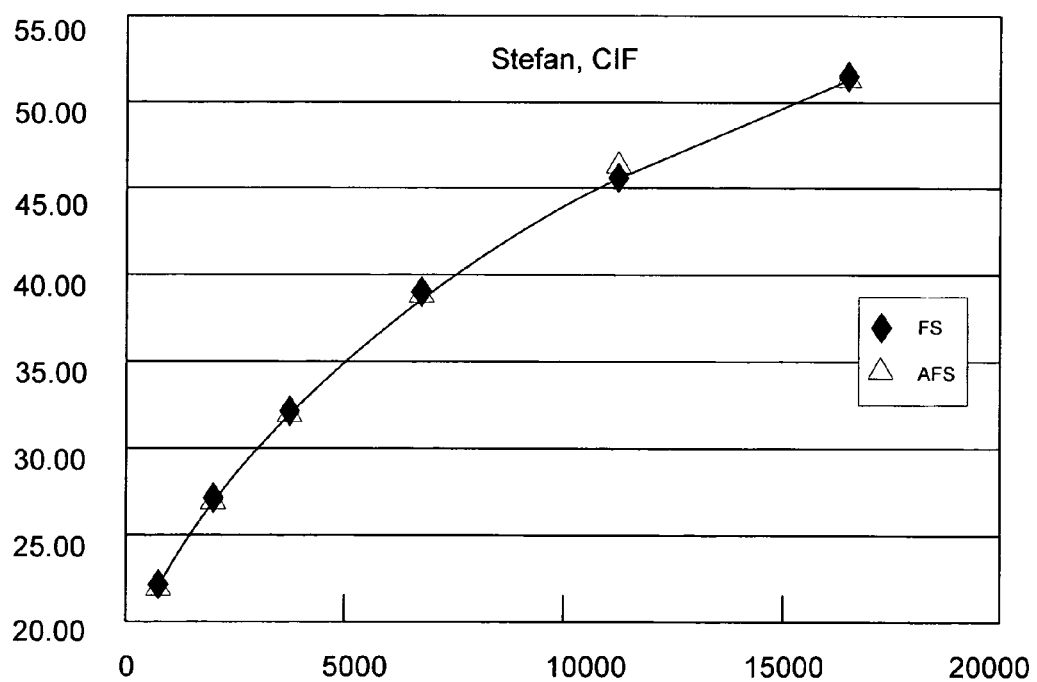
FIG. 8 shows a simulation result of selecting a coding mode for a CIF (352 by 288 pixels) video sequences "Stefan" (300 frames) by means of a preferred embodiment in accordance with the present invention.
Figure 9:
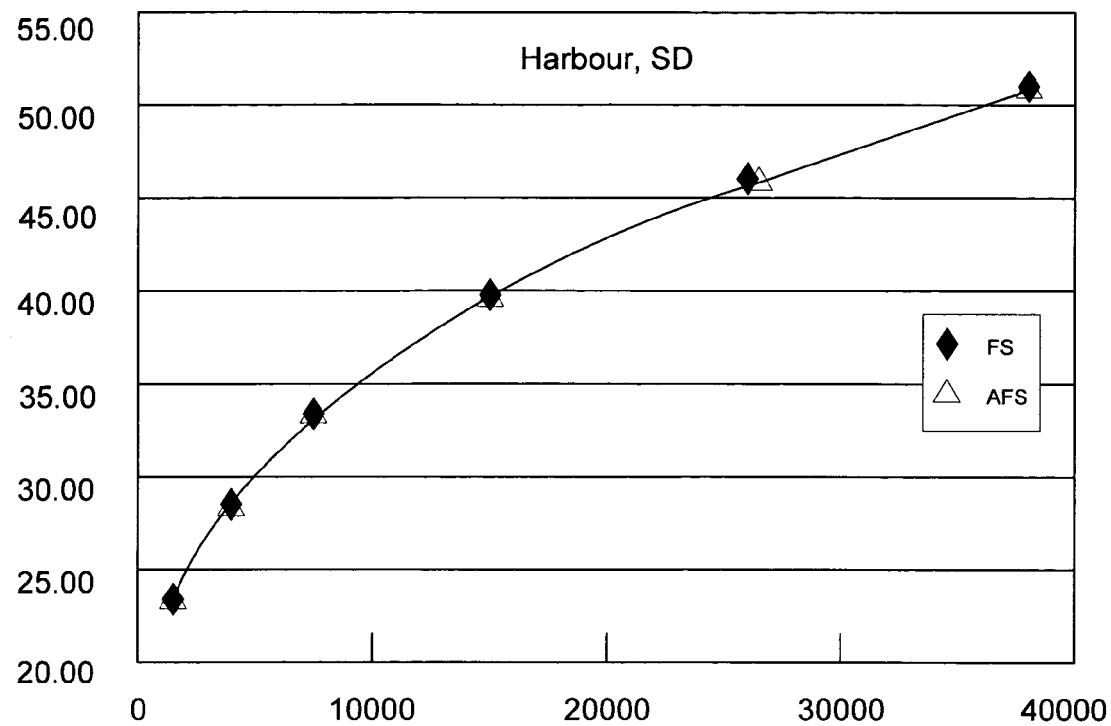
FIG. 9 shows a simulation result of selecting a coding mode for an SD (720 by 480 pixels) video sequences "Harbour" (300 frames) by means of a preferred embodiment in accordance with the present invention.
Figure 10:
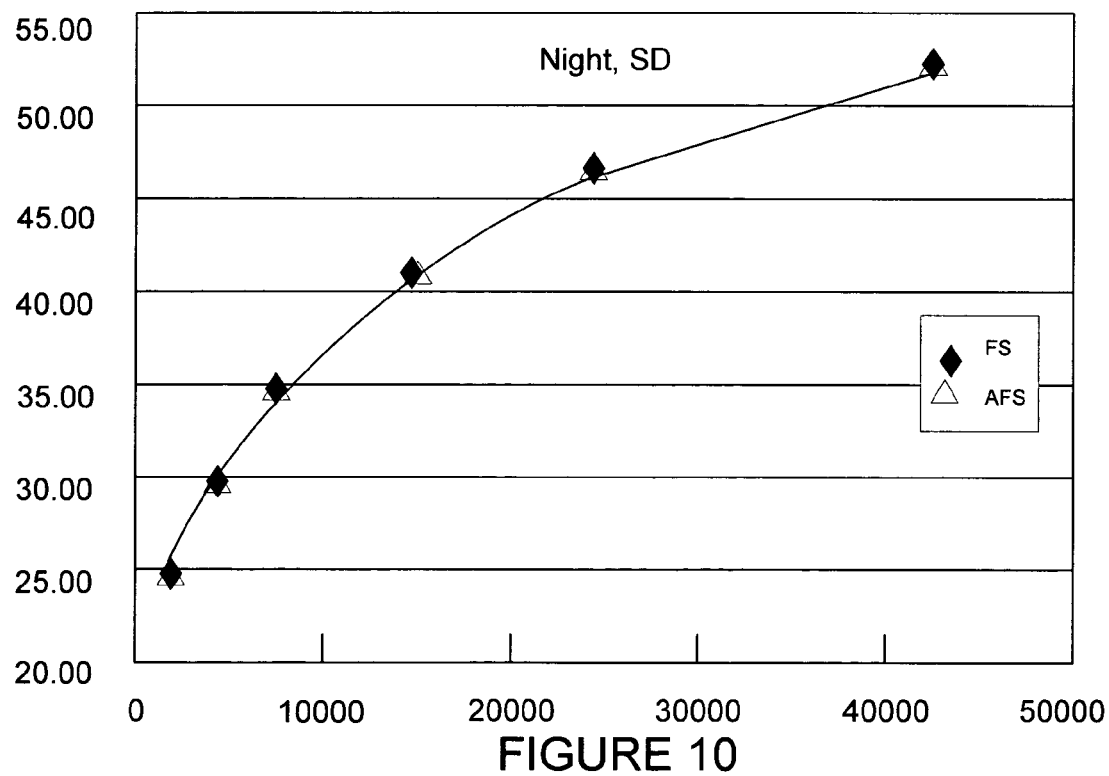
FIG. 10 shows a simulation result of selecting a coding mode for an SD (720 by 480 pixels) video sequences "Night" (300 frames) by means of a preferred embodiment in accordance with the present invention.

FIG. 4 shows an apparatus 40 for selecting a coding mode of intra prediction in video compression in accordance with another preferred embodiment of the present invention. In the preferred embodiment, apparatus 40 receives and analyzes subsequent video image frames to select a best coding mode of the intra prediction.

As shown, apparatus 40 includes input port 41 for receiving data including a current coding block, boundary pixels of the current coding block, a quantization parameter, and modes of neighboring blocks, and output port 47 for outputting a selected optimal mode and a minimum cost after analysis. The boundary pixels of the current block are then processed by calculator A 42 for calculating an estimated sum of predicted block for a mode. As described above, the estimated sum of the predicted block is calculated according to the equations shown in Table XI. Apparatus 40 further includes calculator B 43 for calculating the sum of the current coding block (SUMC) according the equation (4) described above. Initially, all of the estimated sums of the predicted blocks for all modes are calculated. Comparator 44 compares the absolute differences between the estimated sums and the sum of the current coding block, and then chooses mode k of which the absolute difference is smallest among all of the modes as an initial mode.

Apparatus 40 further includes generator 45 for generating a predicted block Pk for mode k and calculator C 46 calculates the cost COST(k) according to the above equation (2) after Pk is generated. The cost COST(k) is then set as an initial minimum cost COSTmin. Preferably, the initial minimum cost COSTmin and the initial mode k are stored in memory 48.

After the initial optimal mode and minimum cost are set, calculator A 42 continues calculating an estimated sum of predicted block for mode n (ESUMP(n)), where n≠k. Comparator 44 again compares the absolute difference between ESUMP(n) and SUMC. If |ESUMP(n)−SUMC| is smaller than COSTmin stored in memory 48, comparator 44 outputs a signal to enable generator 45 to generate predicted block Pn and calculator C 46 to calculate COST(n). In this case, if COST(n) is smaller than COSTmin, the optimal mode and the minimum cost in memory 48 are updated to be mode n and COST(n).

The above procedures continues until all of the modes are calculated and compared. At the end, the final optimal mode and COSTmin are output by output port 47 to another apparatus (not shown) for further processing.

Although in the above embodiment, apparatus 40 includes various elements, it is known in the art that apparatus 40 can be embodied as a single microprocessor or multiple microprocessors depending on the applications.

The above AFS method and apparatus can be preferably embodied into the H.264 reference program JM 7.3. To prove the superiority of the AFS method in accordance with the present invention to the conventional FS method, four CIF (352 by 288 pixels) video sequences, "Akiyo", "Foreman", "News", and "Stefan", and two SD (720 by 480 pixels) video sequences, "Harbour" and "Night" are used to evaluate the performance of the AFS method of the present invention. These video sequences are encoded as I-frames and using fixed quantization parameter (QP) for each frame. In each frame, the partition of block is fixed to 4 by 4 pixels. Simulations with various QP values are also examined. The results of the experiments are shown in FIGS. 5-10, respectively.

FIGS. 5-10 show the performance comparisons between the conventional FS method and the AFS method of the present invention in terms of peak signal-to-noise ratio (PSNR, unit is dB) and bit-rate (unit is Kbps). The results show that the performance of compression for the AFS method is almost the same as the conventional FS method. However, the operations required for additions and shifts used in the AFS method is much less than those required in the conventional FS method, as described above.

Figure 11:
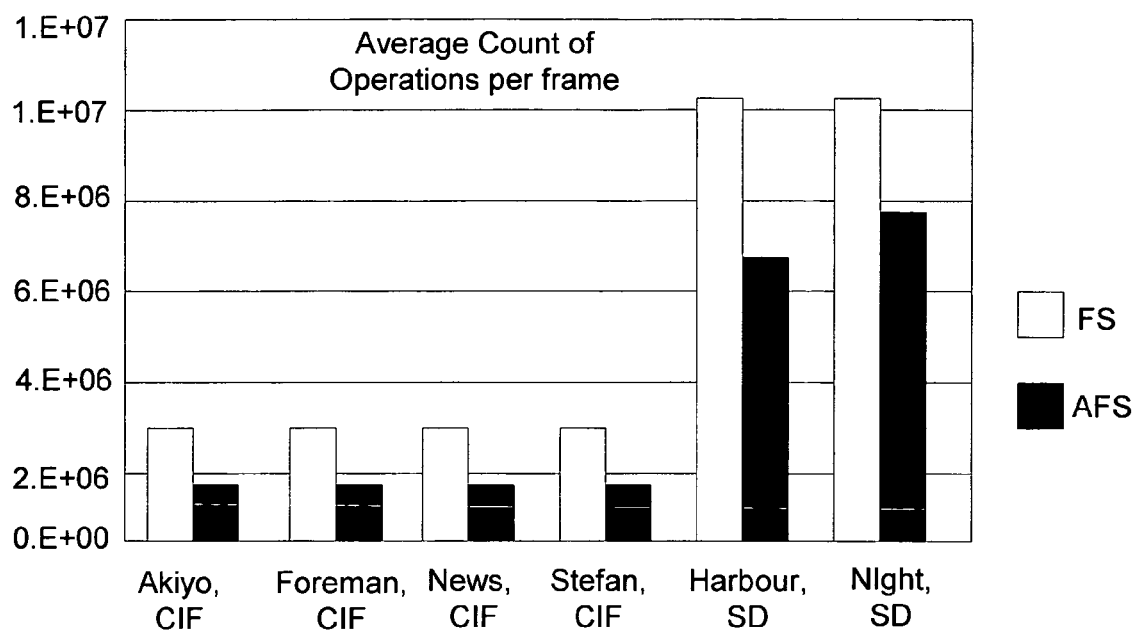
FIG. 11 is a diagram showing the average count of operations per frame for each video sequence by using a full search method and an alternative full search method.

FIG. 11 shows the average count of operations per frame for each video sequence by using the conventional FS method and the AFS method. As shown in this figure, the complexity of the AFS method (i.e., the operations required for accumulative multiplication, additions and shifts) is between 48% and 71% of the operations needed by the conventional FS method, whereas the PSNR and bit-rate of the AFS method is approximately equal to that of the conventional FS method.

Furthermore, Table XII shows the accuracy of estimating the sums of the predicted blocks by using the AFS method of the present invention. Simulation results are given in terms of the average of |ESUMP(m)−SUMP(m)| for each mode m when QP is 24. From Table XII, the simulation results show that the differences between the estimated and actual sums of the predicted blocks are very small. That is, the present method can quickly obtain the estimated sums without actually generating the predicted blocks, whereby further reducing the computational complexity.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

TABLE I

Expressions for generating predictors in mode 0

| Mode | Predictor | Expression for Generating Predictor | Count of Operations | Total |
|---|---|---|---|---|
| 0 | e, e, i, m | A | 0 | 0 |
|   | b, f, j, n | B | 0 |   |
|   | c, g, k, o | C | 0 |   |
|   | d, h, l, o | D | 0 |   |

TABLE II

Expressions for generating predictors in mode 1

| Mode | Predictor | Expression for Generating Predictor | Count of Operations | Total |
|---|---|---|---|---|
| 1 | a, b, c, d | I | 0 | 0 |
|   | e, f, g, h | J | 0 |   |
|   | i, j, k, l | K | 0 |   |
|   | m, n, o, p | L | 0 |   |

TABLE III

Expressions for generating predictors in mode 2

| Mode | Predictor | Expression for Generating Predictor | Count of Operations | Total |
|---|---|---|---|---|
| 2 | a, b, c, d, e, f, g, h, i, j, k, l, m, n, o, p | (A + B + C + D + I + J + K + L + 4)>>3 | 9 | 9 |

TABLE IV

Expressions for generating predictors in mode 3

| Mode | Predictor | Expression for Generating Predictor | Count of Operations | Total |
|---|---|---|---|---|
| 3 | a | (A + C + 2B + 2)>>2 | 3 | 27 |
|   | b, e | (B + D + 2C + 2)>>2 | 4 |   |
|   | c, f, i | (C + E + 2D + 2)>>2 | 4 |   |
|   | d, g, j, m | (D + F + 2E + 2)>>2 | 4 |   |
|   | h, k, n | (E + G + 2F + 2)>>2 | 4 |   |
|   | l, o | (F + H + 2G + 2)>>2 | 4 |   |
|   | p | (G + 3H + 2)>>2 | 4 |   |

TABLE V

Expressions for generating predictors in mode 4

| Mode | Predictor | Expression for Generating Predictor | Count of Operations | Total |
|---|---|---|---|---|
| 4 | m | (L + 2K + J + 2)>>2 | 4 | 28 |
|   | i, n | (K + 2J + I + 2)>>2 | 4 |   |
|   | e, j, o | (J + 2I + X + 2)>>2 | 4 |   |

TABLE V-continued

Expressions for generating predictors in mode 4

| Mode | Predictor | Expression for Generating Predictor | Count of Operations | Total |
|---|---|---|---|---|
|   | a, f, k, p | (I + 2X + A + 2)>>2 | 4 |   |
|   | b, g, l | (X + 2A + B + 2)>>2 | 4 |   |
|   | c, h | (A + 2B + C + 2)>>2 | 4 |   |
|   | d | (B + 2C + D + 2)>>2 | 4 |   |

TABLE VI

Expressions for generating predictors in mode 5

| Mode | Predictor | Expression for Generating Predictor | Count of Operations | Total |
|---|---|---|---|---|
| 5 | a, j | (X + A + 1)>>1 | 3 | 36 |
|   | b, k | (A + B + 1)>>1 | 3 |   |
|   | c, l | (B + C + 1)>>1 | 3 |   |
|   | d | (C + D + 1)>>1 | 3 |   |
|   | e, n | (I + 2X + A + 2)>>2 | 4 |   |
|   | f, o | (X + 2A + B + 2)>>2 | 4 |   |
|   | g, p | (A + 2B + C + 2)>>2 | 4 |   |
|   | d | (B + 2C + D + 2)>>2 | 4 |   |
|   | i | (X + 2I + J + 2)>>2 | 4 |   |
|   | m | (I + 2J + K + 2)>>2 | 4 |   |

TABLE VII

Expressions for generating predictors in mode 6

| Mode | Predictor | Expression for Generating Predictor | Count of Operations | Total |
|---|---|---|---|---|
| 6 | a, g | (X + I + 1)>>1 | 3 | 36 |
|   | b, h | (I + 2X + A + 2)>>2 | 4 |   |
|   | c | (X + 2A + B + 2)>>2 | 4 |   |
|   | d | (A + 2B + C + 2)>>2 | 4 |   |
|   | e, k | (I + J + 1)>>1 | 3 |   |
|   | f, l | (X + 2I + J + 2)>>2 | 4 |   |
|   | i, o | (J + K + I)>>1 | 3 |   |
|   | j, p | (I + 2J + K + 2)>>2 | 4 |   |
|   | m | (K + L + 1)>>1 | 3 |   |
|   | n | (J + 2K + L + 2)>>2 | 4 |   |

TABLE VIII

Expressions for generating predictors in mode 7

| Mode | Predictor | Expression for Generating Predictor | Count of Operations | Total |
|---|---|---|---|---|
| 7 | a | (A + B + 1)>>1 | 3 | 35 |
|   | b, i | (B + C + 1)>>1 | 3 |   |
|   | c, j | (C + D + 1)>>1 | 3 |   |
|   | d, k | (D + E + 1)>>1 | 3 |   |
|   | l | (E + F + 1)>>1 | 3 |   |
|   | e | (A + 2B + C + 2)>>2 | 4 |   |
|   | f, m | (B + 2C + D + 2)>>2 | 4 |   |
|   | g, n | (C + 2D + E + 2)>>2 | 4 |   |
|   | h, o | (D + 2E + F + 2)>>2 | 4 |   |
|   | p | (E + 2F + G + 2)>>2 | 4 |   |

TABLE IX

Expressions for generating predictors in mode 8

| Mode | Predictor | Expression for Generating Predictor | Count of Operations | Total |
|---|---|---|---|---|
| 8 | a | (I + J + 1)>>1 | 3 | 21 |
|   | b | (I + 2J + K + 2)>>2 | 4 | |
|   | c, e | (J + K + 1)>>1 | 3 | |
|   | d, f | (J + 2K + L + 2)>>2 | 4 | |
|   | g, i | (K + L + 1)>>1 | 3 | |
|   | h, j | (K + 2L + L + 2)>>2 | 4 | |
|   | k, l, m, n, o, p | L | 0 | |

TABLE X

Complexity for generating the 4 by 4 predicted block Pm according to mode m

| Mode (m) | Count of Operations for Pm |
|---|---|
| 0 | 0 |
| 1 | 0 |
| 2 | 9 |
| 3 | 27 |
| 4 | 28 |
| 5 | 36 |
| 6 | 36 |
| 7 | 35 |
| 8 | 21 |
| Total: | 192 operations |

TABLE XI

Present expressions and complexity for calculating ESUMP(m)

| Mode (m) | Expression for ESUMP(m) | Count of Operations |
|---|---|---|
| 0 | (4A + 4B + 4C + 4D) | 3 |
| 1 | (4I + 4J + 4K + 4L) | 3 |
| 2 | (ESUMP(0) + ESUMP(1) + 16)>>5<<4 | 4 |
| 3 | (A + 4B + 8C + 12D + 14E + 12F + 8G + 5H + 8)>>2 | 9 |
| 4 | (12A + 8B + 4C + D + 12I + 8J + 4K + L + 14X + 8)>>2 | 10 |
| 5 | (16A + 15B + 10C + 3D + 5I + 3J + K + 11X + 8)>>2 | 9 |
| 6 | (5A + 3B + C + 16I + 15J + 10K + 3L + 11X + 8)>>2 | 9 |
| 7 | (3A + 10B + 15C + 16D + 13E + 6F + G + 8)>>2 | 8 |
| 8 | (3I + 10J + 15K + 36L + 4)>>2 | 5 |
| Total: | | 60 operations |

TABLE XII

Average of absolute difference between ESUMP(m) and SUMP(m) when QP is 24

| Sequence | Intra Prediction Mode (m) | | | | | | | | |
|---|---|---|---|---|---|---|---|---|---|
| | 0 | 1 | 2 | 3 | 4 | 5 | 6 | 7 | 8 |
| Akiyo | 0.00 | 0.00 | 0.00 | 1.67 | 1.58 | 1.23 | 1.22 | 1.41 | 1.07 |
| Foreman | 0.00 | 0.00 | 0.00 | 1.51 | 1.53 | 1.28 | 1.29 | 1.29 | 1.19 |
| News | 0.00 | 0.00 | 0.00 | 1.66 | 1.58 | 1.26 | 1.26 | 1.40 | 1.11 |
| Stefan | 0.00 | 0.00 | 0.00 | 1.58 | 1.56 | 1.34 | 1.37 | 1.42 | 1.21 |
| Harbour | 0.00 | 0.00 | 0.00 | 1.44 | 1.51 | 1.39 | 1.30 | 1.29 | 1.27 |
| Night | 0.00 | 0.00 | 0.00 | 1.53 | 1.54 | 1.26 | 1.27 | 1.29 | 1.18 |

What is claimed is:

1. An apparatus for selecting a coding mode of intra prediction in video compression, comprising:
   an input port for receiving data including a current coding block, boundary pixels surrounding the current coding block, a quantization parameter, and modes of neighboring blocks;
   a microprocessor configured to determine at least one of an optimal mode or a minimum cost used for the video compression based on the received data, wherein the microprocessor further comprises a calculator configured to calculate the sum of the current coding block, the sum of the current coding block SUMC being calculated by the following equation:

$$SUMC = \Sigma\Sigma C(i,j),$$

wherein $C(i, j)$ is a pixel intensity at coordinate $(i, j)$ of the current coding block C; and
   an output port for outputting the at least one of the optimal mode and the minimum cost.

2. The apparatus of claim 1, wherein the microprocessor further comprises another calculator configured to calculate estimated sums of predicted blocks for all modes and a means for determining the coding mode of intra prediction based on the calculated estimated sums.

3. The apparatus of claim 2, wherein the microprocessor further comprises:
   a comparator configured to compare the estimated sums of the predicted blocks with a sum of the current coding block, and choosing a specific mode k;
   a generator configured to generate a predicted block for the mode k; and
   another calculator configured to calculate a cost COST(k) for the mode k.

4. The apparatus of claim 3, wherein in the mode k, an absolute difference between the estimated sum of the predicted block for mode k and the sum of the current coding block has a smallest value, and the cost COST(k) and mode k are set as initial values of a temporary minimum cost and a temporary optimal mode, respectively.

5. The apparatus of claim 4, wherein the temporary minimum cost and the temporary optimal coding mode are stored in a memory.

6. The apparatus of claim 3, wherein the comparator further compares a cost COST(n) for a mode n (n is not equal to k) with the temporary minimum cost and if the cost COST(n) is smaller than the temporary minimum cost, the microprocessor updates the temporary minimum cost to the cost COST(n) and the temporary optimal coding mode to the mode n.

7. The apparatus of claim 6, wherein after all of the modes are compared by the comparators, the output port outputs the most updated temporary minimum cost and temporary optimal coding mode as the optimal minimum cost and the optimal coding mode.

8. The apparatus of claim 2, wherein the estimated sums of the predicted blocks for all modes are determined by mathematic functions of the surrounding boundary pixels.

9. A method for selecting a coding mode of intra prediction in video compression, comprising:
receiving data including a current coding block, boundary pixels surrounding the current coding block, a quantization parameter, and modes of neighboring blocks;
calculating a sum of the current coding block SUMC is calculated by the given equation:

$$SUMC = \Sigma\Sigma C(i,j),$$

wherein $C(i, j)$ is a pixel intensity at coordinate $(i, j)$ of the current coding block C;
calculating estimated sums of predicted blocks for all modes; and
determining an optimal coding mode based on the estimated sums of the predictor blocks, wherein determining the optimal coding mode is performed by a microprocessor configured to determine the optimal coding mode, wherein the optimal coding mode includes a feature that a sum of absolute difference between the predicted block for the optimal coding mode and the current coding block is smallest among all of the modes.

10. The method of claim 9, wherein the estimated sums of the predicted blocks are determined by mathematic functions of the surrounding boundary pixels.

11. The method of claim 9, further comprising:
calculating estimated sums ESUMP(m) of the predicted blocks for all modes m;
calculating a sum of the current coding block SUMC;
comparing absolute differences between the estimated sums of the predicted blocks and the sum of the current coding block (i.e., |ESUMP(m)−SUMC|);
finding a mode k of which the absolute difference |ESUMP(k)−SUMC| is smallest among all of the modes;
generating a predicted block Pk for the mode k;
calculating a cost COST(k) of the predicted block Pk; and
setting the cost COST(k) and the mode k as an initial minimum cost COSTmin and an initial optimal mode, respectively.

12. The method of claim 11, wherein the cost is calculated by the following equation:

$$COST(m) = SAD(m) + 4*F(QP)*MP$$

wherein SAD(m) is the sum of absolute difference between the predicted block for the mode m and the current coding block, F(QP) is a function of the quantization parameter (QP) and $F(QP) \geq 0$, MP is 0 if m is the most probable mode and is 1 otherwise.

13. The method of claim 11, further comprising:
comparing the absolute difference between the estimated sum for the mode n and the sum of the current coding block with the initial minimum cost COSTmin; and
if the absolute difference is smaller than the initial minimum cost COSTmin,
generating a predicted block for the mode n;
calculating a cost COST(n) of the mode n;
comparing the cost COST(n) with the initial minimum cost COSTmin, and
if the cost COST(n) is smaller than the initial minimum cost COSTmin, updating the minimum cost COSTmin and the optimal mode to be COST(n) and n, respectively.

14. The method of claim 11, wherein the mode of which the absolute difference between the calculated estimated sum and the sum of the current coding block is larger than the initial minimum cost COSTmin is skipped for operation.

15. A method for calculating estimated sums of predicted blocks in a video compression application, comprising:
receiving boundary pixels that are surrounding the current coding block; and
calculating estimated sums of the predicted blocks according to mathematic functions of the boundary pixels without actually forming the predicted blocks for all modes, wherein calculating the estimated sums is performed by a microprocessor configured to calculate estimated sums, wherein the estimated sum of the predicted block for a mode in (ESUMP(m)) is calculated by the following equation:

$$ESUMP(m) = ((\Sigma(WCm(i,j)*BP(i,j))) + RCm) >> SRm << SLm,$$

wherein $BP(i, j)$ is the intensity of the boundary pixel at coordinate $(i, j)$ that is surrounding the current coding block, $WCm(i, j)$ is the weighting constant of $BP(i, j)$ for the mode m, RCm is the rounding constant for the mode m, SRm and SLm are the numbers of shift-right and shift-left operations for the mode m, respectively, and symbols and are bit-wise operators for shift-right and shift-left operations, respectively.

16. The method of claim 15, wherein the predicted blocks are 4 by 4 blocks.

17. The method of claim 16, wherein the estimated sums ESUMP(m) of the predicted blocks are calculated by the following equations:

| Mode (m) | Expression for ESUMP(m) |
| --- | --- |
| 0 | (4A + 4B + 4C + 4D) |
| 1 | (4I + 4J + 4K + 4L) |
| 2 | (ESUMP(0) + ESUMP(1) + 16)>>5<<4 |
| 3 | (A + 4B + 8C + 12D + 14E + 12F + 8G + 5H + 8)>>2 |
| 4 | (12A + 8B + 4C + D + 12I + 8J + 4K + L + 14X + 8)>>2 |
| 5 | (16A + 15B + 10C + 3D + 5I + 3J + K + 11X + 8)>>2 |
| 6 | (5A + 3B + C + 16I + 15J + 10K + 3L + 11X + 8)>>2 |
| 7 | (3A + 10B + 15C + 16D + 13E + 6F + G + 8)>>2 |
| 8 | (3I + 10J + 15K + 36L + 4)>>2 | wherein A, B, C, D, B, F, G, H, I, J, K, L, and X are the boundary pixels that surround the current coding block and symbols >> and << are bit-wise operators for shift-right and shift-left operations, respectively.

* * * * *

UNITED STATES PATENT AND TRADEMARK OFFICE
CERTIFICATE OF CORRECTION

| | | |
|---|---|---|
| PATENT NO. | : 7,706,442 B2 | Page 1 of 1 |
| APPLICATION NO. | : 11/057125 | |
| DATED | : April 27, 2010 | |
| INVENTOR(S) | : Kuo | |

It is certified that error appears in the above-identified patent and that said Letters Patent is hereby corrected as shown below:

Column 14,

Line 19, "mode in" should read --mode m--;

Line 30, "symbols and" should read --symbols >> and <<--;

Line 54, "B" should read --E--. (second occurrence)

Signed and Sealed this
Twenty-second Day of February, 2011

David J. Kappos
*Director of the United States Patent and Trademark Office*